United States Patent
Go et al.

(10) Patent No.: US 7,599,900 B2
(45) Date of Patent: Oct. 6, 2009

(54) METHOD AND SYSTEM FOR USING BAYESIAN NETWORK MODELS IN DISTRIBUTED SENSOR ENVIRONMENT

(75) Inventors: Young Cheol Go, Daejeon (KR); Joo Chan Sohn, Daejeon (KR); Young Jo Cho, Seongnam (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 413 days.

(21) Appl. No.: 11/600,400

(22) Filed: Nov. 15, 2006

(65) Prior Publication Data
US 2007/0118555 A1 May 24, 2007

(30) Foreign Application Priority Data
Nov. 23, 2005 (KR) ............ 10-2005-0112333
Jun. 19, 2006 (KR) ............ 10-2006-0054905

(51) Int. Cl.
G06N 5/00 (2006.01)
(52) U.S. Cl. ............................................. 706/45
(58) Field of Classification Search ............... 706/45, 706/46, 47
See application file for complete search history.

(56) References Cited

U.S. PATENT DOCUMENTS 6,957,202 B2 * 10/2005 Skaanning et al. ............ 706/20
2002/0069134 A1 * 6/2002 Solomon ..................... 705/26
2003/0055321 A1 * 3/2003 Watrous et al. .............. 600/300
2003/0233305 A1 * 12/2003 Solomon ..................... 705/37
2003/0233310 A1 * 12/2003 Stavrovski .................. 705/37

FOREIGN PATENT DOCUMENTS

| KR | 100343155 | 6/2002 |
| KR | 10-2005-00581864 | 6/2005 |
| KR | 10-0525072 | 10/2005 |

OTHER PUBLICATIONS

Mary J. Meixell et al., Scenario Analysis of Demand in a Technology Market Using Leading Indicators, 2001, IEEE, 65-75.*

* cited by examiner

Primary Examiner—Wilbert L Starks, Jr.
(74) Attorney, Agent, or Firm—Blakely, Sokoloff, Taylor & Zafman LLP

(57) ABSTRACT

Provided are a method and system for modeling a service using a Bayesian network and status information in a distributed environment. The method includes creating a scenario for modeling at least one service, categorizing the service into models according to properties based on the scenario, setting interrelationships including a chronological relationship, a hierarchical relationship, and correlation between the categorized models, and deriving information including a service goal and status information with respect to the models and completing service modeling. Accordingly, a service provider, which digitally provides various services in a ubiquitous environment, can efficiently and actively provide intelligent services. In addition, since a specific method of modeling a service based on probabilities is provided, an intelligent service is modeled efficiently and diversely.

11 Claims, 5 Drawing Sheets

```
...
...
<owl:Class rdf:ID="Model"/>
<owl:Class rdf:ID="Greet">
        <rdfs:subClassOf rdf:resource="#Model"/>
</owl:Class>
<owl:Class rdf:ID="Contents">
        <rdfs:subClassOf rdf:resource="#Model"/>
</owl:Class>
<owl:Class rdf:ID="RoboCare">
        <rdfs:subClassOf rdf:resource="#Model"/>
</owl:Class>
<owl:Class rdf:ID="Motive"/>
...
...
```
— 510

FIG. 6

```
...
<owl:Class rdf:ID="Model"/>
<owl:Class rdf:ID="Greet">
    <rdfs:subClassOf rdf:resource ="#Model"/>
</owl:Class>
...
<owl:ObjectProperty rdf:about = "hasSuperModel">
    <rdfs:domain rdf:resource ="#Model"/>
    <rdfs:range rdf:resource ="#Model"/>
</owl:ObjectProperty >
<owl:ObjectProperty rdf:about = "hasSubModel">
    <rdfs:inverseOf rdf:resource = #hasSuperModel/>
    <rdfs:domain rdf:resource ="#Model"/>
    <rdfs:range rdf:resource ="#Model"/>
</owl:ObjectProperty >
...
<Greet rdf:ID= "GreetAtPorch"/>
<Greet rdf:ID= "GreetAtGettingUp"/>
<Greet rdf:ID= "GreetAtSleepting"/>
<Greet rdf:ID= "GreetAtCleaning">
    <hasSubModel rdf:resource ="#GreetAtPorch "/>
</Greet>
...
```
— 610

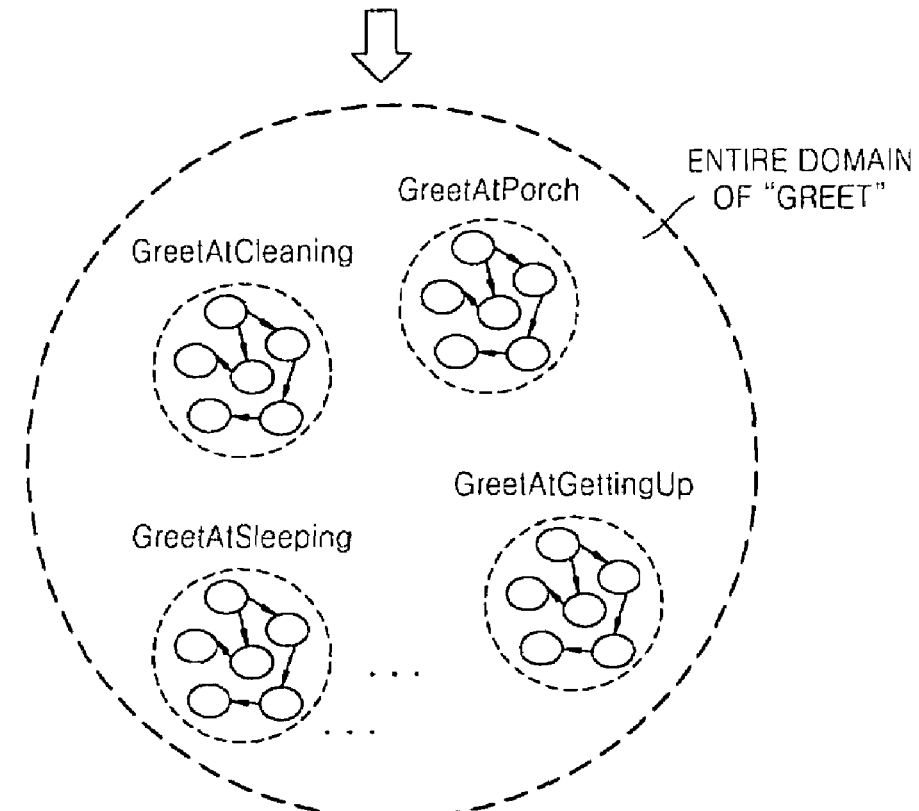

METHOD AND SYSTEM FOR USING BAYESIAN NETWORK MODELS IN DISTRIBUTED SENSOR ENVIRONMENT

CROSS-REFERENCE TO RELATED PATENT APPLICATIONS

This application claims the benefit of Korean Patent Application No. 10-2005-0112333, filed on Nov. 23, 2005 and Korean Patent Application No. 10-2006-0054905, filed on Jun. 19, 2006 in the Korean Intellectual Property Office, the disclosures of which are incorporated herein in their entirety by reference.

BACKGROUND OF THE INVENTION

1. Field of the Invention

The present invention relates to a method and system for modeling and managing services based on probabilities in order to provide intelligent services in a ubiquitous environment, and more particularly, to a method and system for modeling a service based on probabilities and for managing and using the service in a distributed environment, thereby effectively and easily representing and managing an intelligent service.

2. Description of the Related Art

A ubiquitous environment is constructed in order to provide an appropriate service to a user. To achieve this purpose, a service is provided using status information on a user's ambient conditions.

Deriving the user status information always involves uncertainty. It may be technologically impossible to obtain the user status information or only a part of the desired user status information may be obtained due to diverse reasons even if it is technologically possible. However, even in such a condition of no information, a user wishes to be provided with an appropriate service.

To provide an intelligent service in the ubiquitous environment, not only context is used but also a service needs to be modeled intelligently. However, most research has focused on a system and applications for providing services. A specific method of intelligently modeling a service and managing the service has been rarely suggested. Even if a method of modeling a service is suggested, it is just used for an individual unit but is difficult to be used in a distributed environment such as a ubiquitous environment.

To provide an intelligent service in a state like a ubiquitous environment where a computing unit and content, which is an object of computing, are distributed and managed, a method of modeling an intelligent service and efficiently managing modeling information in the distributed environment is desired.

SUMMARY OF THE INVENTION

The present invention provides a method and system for modeling an intelligent service using a Bayesian network and context information and managing the modeled service using an ontology in order to efficiently use the service in a distributed environment.

According to an aspect of the present invention, there is provided a method of modeling a service using a Bayesian network and status information in a distributed environment. The method includes creating a scenario for modeling at least one service; categorizing the service into models according to properties based on the scenario; setting interrelationships including a chronological relationship, a hierarchical relationship, and correlation between the categorized models; and deriving information including a service goal and status information with respect to the models and completing service modeling.

According to another aspect of the present invention, there is provided a system for modeling a service in a distributed environment using a Bayesian network and status information. The system includes at least one agent accessing an ontology server, providing a service, collecting status information, and transmitting the status information to a service model server, at least one service model server selecting a service model appropriate to the status information and providing the selected service model, and at least one ontology server managing an ontology describing the service model. The agent, the service model, and the ontology server are connected to one another through an ontology-based communication network.

BRIEF DESCRIPTION OF THE DRAWINGS

The above and other features and advantages of the present invention will become more apparent by describing in detail exemplary embodiments thereof with reference to the attached drawings in which:

FIG. 6 illustrates an ontology that models a service in specific service statuses and describes the modeling, according to an embodiment of the present invention.

DETAILED DESCRIPTION OF THE INVENTION

Figure 1:
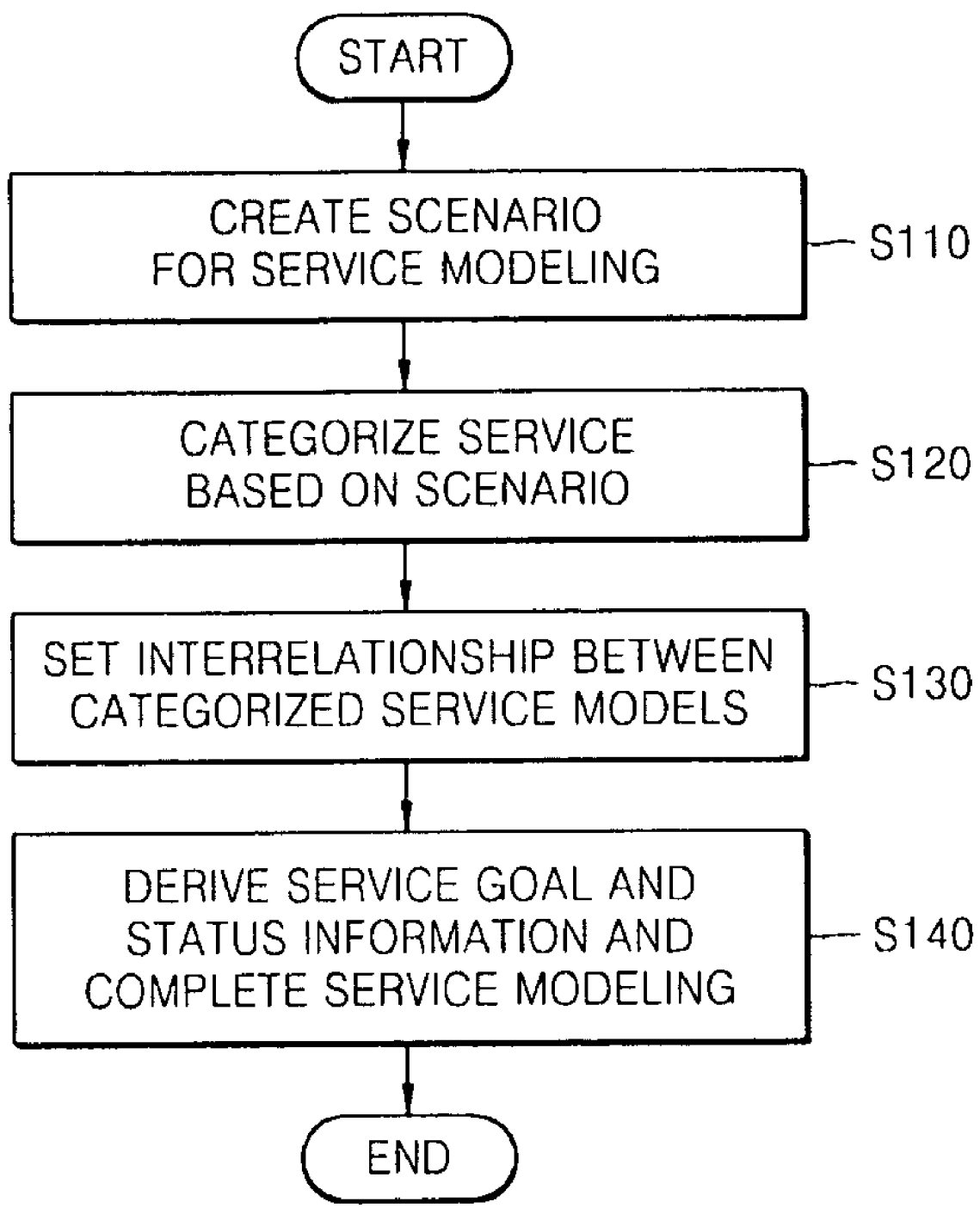
FIG. 1 is a flowchart illustrating a method of modeling a service using a Bayesian network and status information, according to an embodiment of the present invention.
Figure 2:
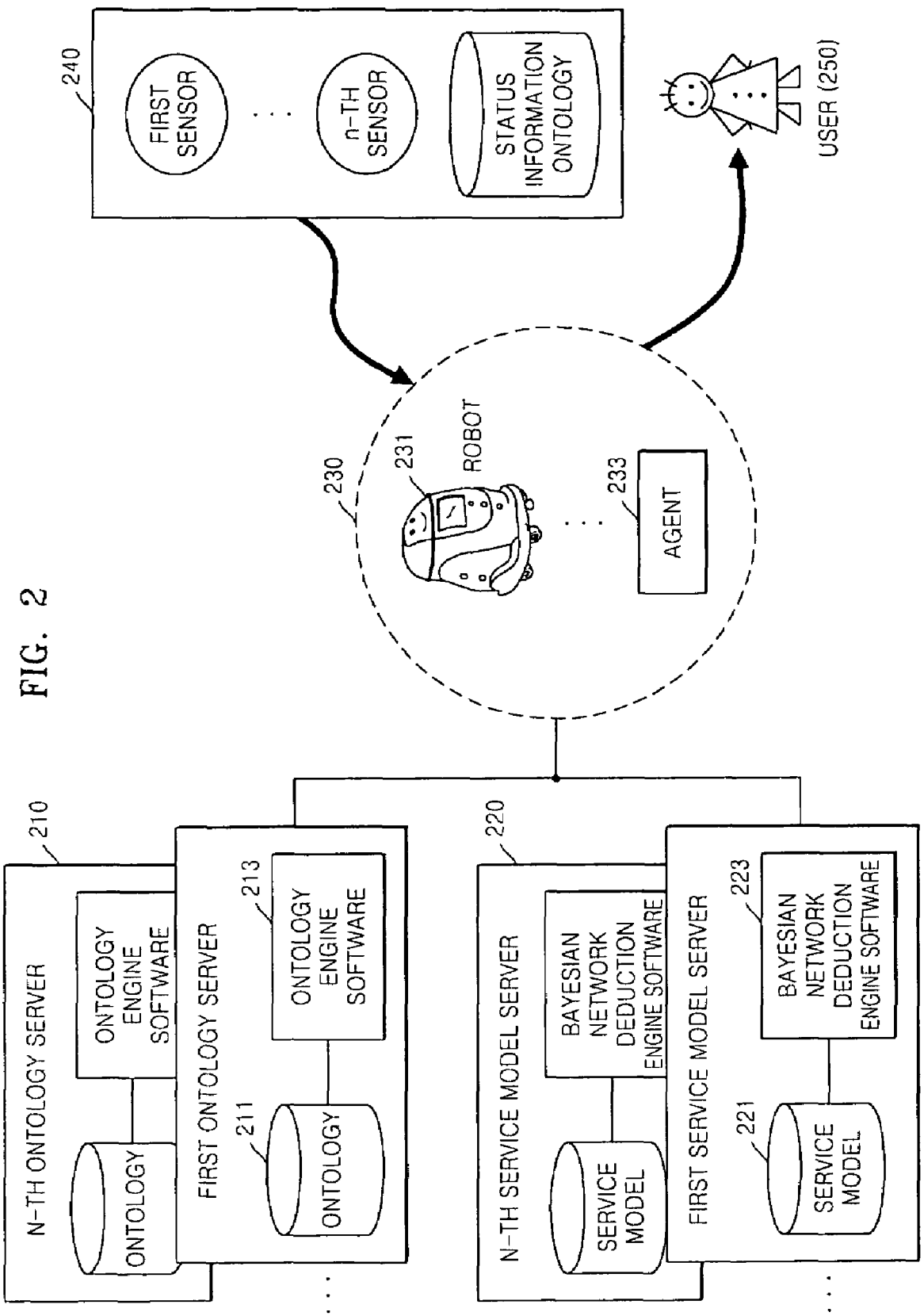
FIG. 2 illustrates a system using an embodiment of the present invention.
Figure 3:
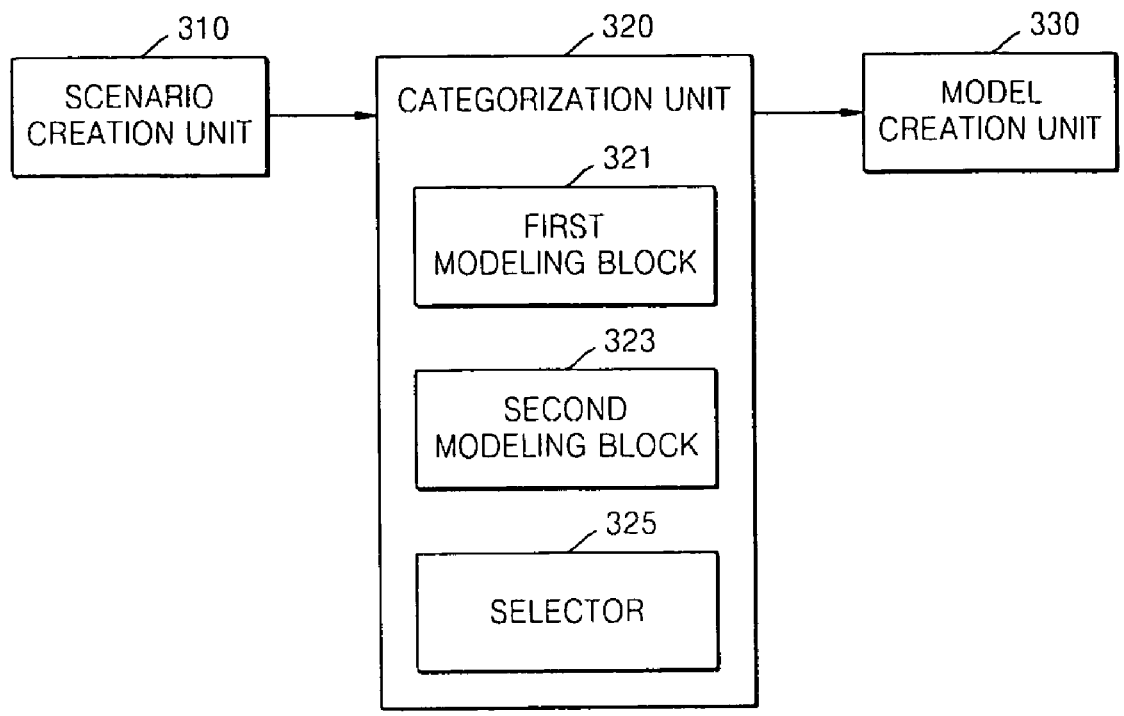
FIG. 3 is a block diagram of a system for modeling a service using a Bayesian network and status information, according to an embodiment of the present invention.
Figure 4:
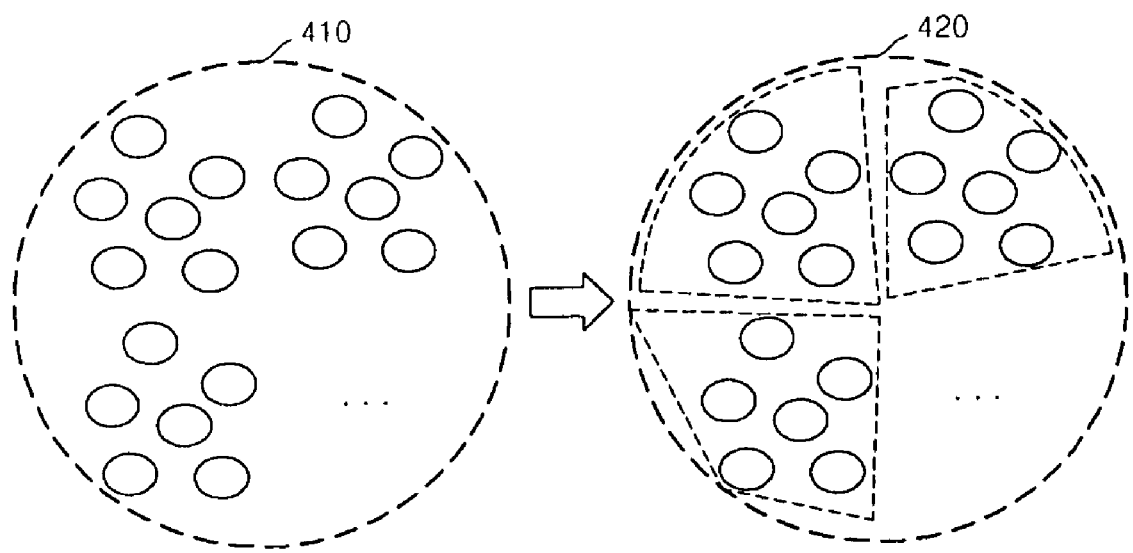
FIG. 4 illustrates a procedure for dividing a target domain into a plurality of particular sections, according to an embodiment of the present invention.
Figure 5:
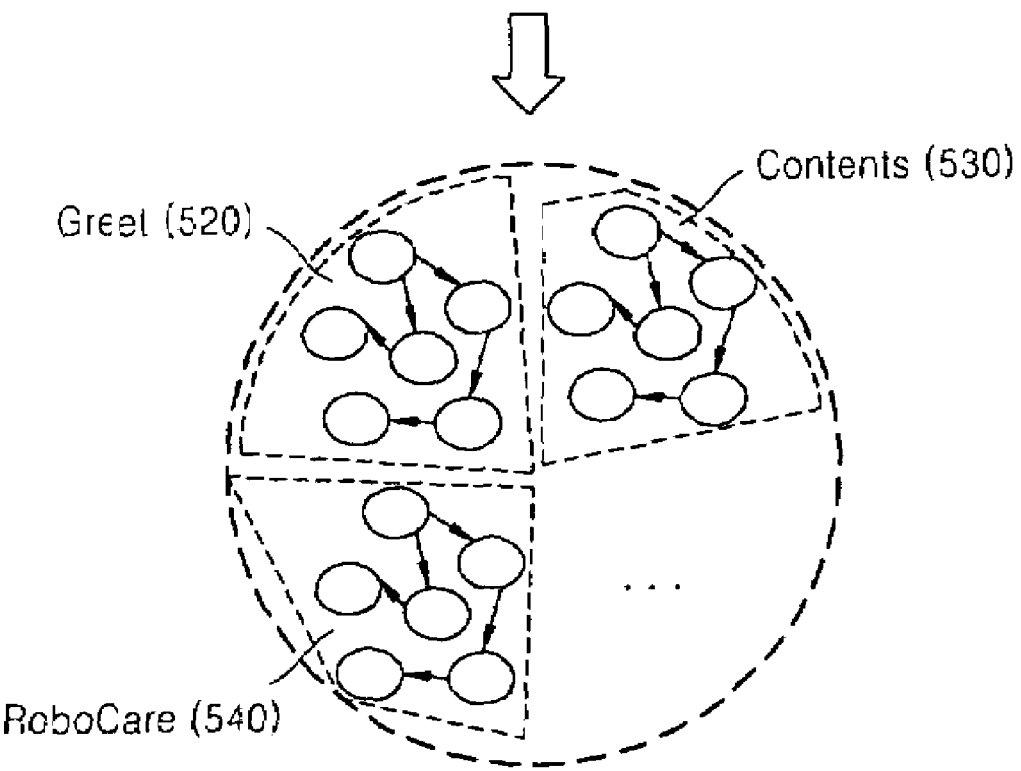
FIG. 5 illustrates an ontology representation of various service models, according to an embodiment of the present invention.

Hereinafter, preferred embodiments of the present invention will be described in detail with reference to the attached drawings. FIG. 1 is a flowchart illustrating a method of modeling a service using a Bayesian network and status information, according to an embodiment of the present invention. FIG. 2 illustrates a system using an embodiment of the present invention. FIG. 3 is a block diagram of a system for modeling a service using a Bayesian network and status information, according to an embodiment of the present invention. FIG. 4 illustrates a procedure for dividing a target domain into a plurality of particular sections, according to an embodiment of the present invention. FIG. 5 illustrates an ontology representation of various service models, according to an embodiment of the present invention. FIG. 6 illustrates an ontology that models a service in specific service statuses and describes the modeling, according to an embodiment of the present invention.

Referring to FIG. 1, in a first stage, a scenario creation unit 310 (shown in FIG. 3) creates a scenario to specify a service in operation S110. The scenario is written in as much detail as possible, including all possible statuses (including unusual ones) with respect to a service and the goal of the service. In other words, the scenario includes a cause of the occurrence of the service, the goal of the service, and the status of the service.

In a second stage, a subdivision unit 320 (shown in FIG. 3) receives the scenario and categorizes the service into models according to various properties based on the scenario in operation S120. Referring to FIG. 3, the categorization unit 320 includes a first modeling block 321, which derives a lower-intermediate goal and performs top-down modeling, a second modeling block 323, which derives a particular goal based on status information and performs bottom-up modeling, and a selector 325, which selects one modeling from among the top-down modeling, the bottom-up modeling, and a combination thereof. Although all statuses can be represented with a single service model, a complex status needs to be categorized into specific statuses in order to facilitate modeling. Therefore, categorization is needed. However, categorization should be performed in order to maintain the overall consistency of a model. For example, when a scenario is written about a 15 service referred to as "greet at home", a greeting status that can occur at home is categorized. Greeting statuses may be divided into a status requiring greeting and a status not requiring greeting and the status requiring greeting may be divided into "greet at a porch" (going out/coming home/going to work/coming from work/going to school/coming from school/visiting/seeing off) and "greet at places other than a porch" (greet at getting up/greet at sleeping/greet at irregular event such as weather or anniversary). Although a status is divided based on greeting, all statuses that can occur at home need to be described. People can easily tell a status not requiring greeting from a status requiring greeting, but a robot or an intelligent agent cannot easily discriminate these statuses. For this reason, a model of a status that is similar to a greeting status but does not require greeting is added. For example, a status in which a person is working such as cleaning or arranging at a porch, a status in which a person goes out for a while to take mail, or a status in which a person gets up at dawn to drink water or go to the bathroom may be modeled.

In a third stage, an interrelationship, i.e., a chronological relationship, a hierarchical relationship, or a correlation is set between categorized service models in operation S130. When the interrelationship is set between models, consistency in models is maintained and a deletion or addition of a model is easily managed. For example, the hierarchical relationship may be represented with "SubClassOf" and the chronological relationship may be represented with "hasSuperModel"/"hasSubModel". The correlation between models is represented with "relatedModel".

In a fourth stage, service modeling is completed in operation S140. In detail, the goal of the service and status information needed to determine a service status are derived from the scenario written in the first stage and then service modeling is performed. In more detail, only an explicit service goal and status information are derived from the scenario in the fourth stage. Among the derived service goal and status information, information repeatedly used in many services is standardized so it may be commonly used so that consistency is maintained. For example, from a scenario "Greet at going to work when a person is at a porch at a time to go out to the office", "time to go out to the office", "a person is at a porch", "the person has a job", "identifying a person", etc. may be derived as status information to be used for modeling. The "time to go out to the office" has a time-zone attribute and may be used as time-zone information in other models. Accordingly, all attributes of information that can be used in common with other models are represented and listed at a single node.

In a fifth stage, service modeling is performed using the service goal derived in the fourth stage. A status that is a cause of the service goal is derived based on the service goal, and a primary intermediate goal is derived. Thereafter, a secondary intermediate goal that is a cause of the primary intermediate goal is derived based on the primary intermediate goal. Such a procedure is repeated. These intermediate goals are not stated in the scenario and are used to allow service models to be represented in a similar manner to the way in which a person thinks about the final service goal. A service of recommending music may be exemplified. First, the final goal of the music recommendation service is providing a music genre such as ballad, jazz, dance, rock, or classics. This genre is set to a node status "What kind of music is wanted?". "What mood is wanted?" and "Is a person who wants music active?" may be derived as primary intermediate goals from the final goal. "Is diversion needed?" and "Should the mood be cheered up?" may be derived as secondary intermediate goals from the primary intermediate goal "What mood is wanted?".

In a sixth stage, service modeling is performed using the status information derived in the fourth stage. A primary specific goal is derived from the combination of the status information. Thereafter, a secondary specific goal is derived from the primary specific goal. Such a derivation is repeated. When the above-described music recommendation service is exemplified, a primary specific goal "Is she/he free?" may be derived from status information "current time zone" and "home alone or not". Primary specific goals "humidity of home" and "warmth of home" may be derived from status information "home humidity" and "home temperature". A secondary particular goal "stuffy?" may be derived from the primary specific goals "humidity of home" and "warmth of home". In addition, a third specific goal "Should the mood be cheered up?" may be derived from "current weather" and "stuffy?".

In a seventh stage, a model creation unit 330 (shown in FIG. 3) completes the service modeling based on the results obtained in the fifth and sixth stages. The result of top-down modeling starting from the cause performed by the first modeling block 321 and the result of bottom-up modeling starting from an effect performed by the second modeling block 323 are used to complete a final model. This procedure makes the service model include a process similar to a person's way of thinking. When the music recommendation service described in the fifth and sixth stages is exemplified, a model is completed by linking intermediate goals derived in the fifth stage with specific goals derived in the sixth stage. The goals derived in the fifth and sixth stages can be combined using the common goal "Should the mood be cheered up?" as a linking point. In actual modeling, a more complicated status may be derived. For the clarity of the description, the simple example is explained.

In an eighth stage, an ontology of the service model is constructed based on the service model completed in the seventh stage. The service model ontology represents information such as specific input and output information that the model expresses and includes motives of status in which the model is selected. When a service model ontology is constructed, systems that can use an ontology can use all information described in the service model ontology.

In a ninth stage, an ontology of the chronological relationship/hierarchical relationship/correlation between models is constructed using the results obtained in the third and eighth stages in order to manage a plurality of models in a distributed environment. The relationship between models can be inferred from the ontology, and information on a status requiring a service can be obtained based on the inferred relationship.

Information described in an ontology can be accessed using a uniform resource identifier (URI). When distributed models are accessed using the URI, what information is defined and where it is defined can be determined. Accordingly, when the ontology is used, information can be efficiently processed in a distributed environment. Although access to the ontology is not limited, only an authorized user may be permitted to access a service model by setting constraints on a user.

When the above-described method according to an embodiment of the present invention is used, a service can be effectively modeled and managed.

Hereinafter, a method and system for creating and managing a service model in a distributed environment according to the present invention will be described with reference to FIG. 2 and FIGS. 4 through 6.

FIG. 2 illustrates a system using the present invention. Status information is obtained from a plurality of distributed sensors and a status information ontology and a service model 221 corresponding to the obtained status information is selected from an ontology 211 including service information. The selected service model 221 is obtained in a distributed environment and a corresponding service which has the status information as input is provided to a user 250. The system manages the service model 221 using the ontology 211 and thus may be structured in various manners. The ontology 211 describing the service model 211 may be managed by a plurality of ontology servers 210. Each of the ontology servers 210 includes the ontology 211 of the service model 211 and ontology engine software 213 which provides diverse queries and derivations using the ontology 211. The service model 221 may be managed by a plurality of service model servers 220. Each of the service model servers 220 include the service model 221 constructed in a Bayesian network and Bayesian network deduction engine software 223 analyzing the service model 221. A service can be provided through a variety of devices 230 such as a robot 231 and an agent 233. The robot 231 and the agent 233 are equipped with service providing client software which analyzes the service model 221 and provides a service to the user 250 based on the analysis result. The above-described elements are logically divided but may not be distributed physically and may be implemented in a single machine or device.

FIG. 4 illustrates a procedure for dividing a target domain into a plurality of specific sections, according to an embodiment of the present invention. An entire domain 410 is divided into various services 420 having common properties based on a scenario created as described above.

FIG. 5 illustrates an ontology 510 that represents various service models, according to an embodiment of the present invention. The ontology 510 defines each of a plurality of models and a relationship between the models. An entire domain is defined as "Model". Greet 520, Contents 530, and RoboCare 540 are sub models of "Model".

FIG. 6 illustrates an ontology 610 that models a service into specific service statuses and describes the modeling, according to an embodiment of the present invention. A "Greet" service domain is divided into "GreetAtPorch", "GreetAtCleaning", "GreetAtSleeping", and "GreetAtGettingUp". The ontology 610 shows that a status of cleaning at a porch is a sub model of the "GreetAtPorch". In addition, the ontology 610 shows that "GreetAtPorch", "GreetAtGettingUp", and "GreetAtSleeping" are sub models of a "Greet" model.

The present invention provides technology for modeling a service, which a variety of devices such as intelligent mobile robots, digital home appliances, and unmanned mobile devices provide in a ubiquitous environment, based on probabilities and status information, and for efficiently managing service models in a distributed environment.

When a service is modeled based on conventional rules and fuzzy logic, an appropriate service may not be provided in an uncertain state like when part of an input necessary to provide the service does not exist. In addition, since a distributed environment is not considered, it is difficult to process service models in the distributed environment. Even if the distributed environment is considered, compatibility between different kinds of systems is not ensured. Accordingly, the present invention provides a method and system for efficiently modeling a service in the distributed environment using a Bayesian network to adaptively provide the service even in the uncertain state. In the present invention, a service is described in web ontology language (OWL), which is a semantic web language, so that a modeled service is used and managed in the distributed environment. In addition, the present invention allows various types of devices in order to allow an appropriate service to be provided to a user in the distributed environment using a deduction from the service model.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

As described above, according to the present invention, an intelligent service is modeled using a Bayesian network and status information and modeled information described in an ontology is efficiently managed in a distributed environment, so that a service provider, which digitally provides various services in a ubiquitous environment, can efficiently and actively provide intelligent services. In addition, the present invention provides a specific method of modeling a service based on probabilities so that an intelligent service is modeled efficiently and diversely.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of modeling a service using a Bayesian network and status information in a distributed environment, the method comprising the operations of:

creating, by a computer system, a scenario to specify at least one service;

categorizing, by the computer system, the service into models according to properties based on the scenario;

setting, by the computer system, interrelationships including a chronological relationship, a hierarchical relationship, and correlation between the categorized models; and deriving, by the computer system from the scenario, information including a service goal and status information;

deriving, by the computer system, intermediate goals from the service goal, wherein the intermediate goals are not stated in the scenario;

deriving, by the computer system, specific goals from a combination of the status information; and linking, by the computer system, the intermediate goals with the specific goals to complete service modeling.

2. The method of claim 1, wherein the operation of creating the scenario comprises creating the scenario based on a cause of occurrence of the service, the service goal, and status of the service.

3. The method of claim 1, wherein the operation of deriving the information comprises describing the information to include all attributes that can be represented in a single node, and the information can be used in at least one service model in common.

4. The method of claim 1, wherein the operation of deriving the information comprises:

deriving a lower-intermediate goal from the service goal to perform top-down modeling;

deriving a particular goal from the status information to perform bottom-up modeling; and performing the service modeling using at least one of the top-down modeling and the bottom-up modeling.

5. The method of claim 1, further comprising:

constructing an ontology of information of the service model; and constructing a management ontology considering the distributed environment based on the ontology of the ontology of information of the service model.

6. The method of claim 5, wherein the ontology of information of the service model represents input and output information of the service model and a motive of a status in which the model is selected.

7. A system for modeling a service in a distributed environment using a Bayesian network and status information, the system comprising:

at least one agent accessing an ontology server, providing a service, collecting status information obtained from a plurality of sensors, and transmitting the status information to a service model server;

at least one service model server selecting a service model appropriate to the status information and providing the selected service model; and at least one ontology server managing data storage that stores an ontology describing the service model, wherein the agent, the service model, and the ontology server are connected to one another through an ontology-based communication network.

8. The system of claim 7, wherein the service model server comprises:

a scenario creation unit creating a scenario to specify the service;

a categorization unit categorizing the service into models according to properties based on the scenario and setting interrelationships including a chronological relationship, a hierarchical relationship, and correlation between the categorized models; and a model creation unit to derive, from the scenario, information including a service goal and status information, to derive intermediate goals not stated in the scenario from the service goal, to derive specific goals from a combination of the status information, and to link the intermediate goals with the specific goals to complete service modeling.

9. The system of claim 8, wherein the scenario creation unit creates the scenario based on a cause of occurrence of the service, the service goal, and status of the service.

10. The system of claim 8, wherein the categorization unit comprises:

a first modeling block deriving a lower-intermediate goal from the service goal to perform top-down modeling;

a second modeling block deriving a particular goal from the status information to perform bottom-up modeling; and a selector selecting at least one of the top-down modeling and the bottom-up modeling.

11. A computer-readable recording medium for recording a program for executing a method of modeling a service using a Bayesian network and status information in a distributed environment, the method comprising:

creating a scenario to specify at least one service;

categorizing the service into models according to properties based on the scenario;

setting interrelationships including a chronological relationship, a hierarchical relationship, and correlation between the categorized models;

deriving, from the scenario, information including a service goal and status information;

deriving intermediate goals from the service goal, wherein the intermediate goals are not stated in the scenario;

deriving specific goals from a combination of the status information; and linking the intermediate goals with the specific goals to complete service modeling.

* * * * *